United States Patent [19]

Lehr

[11] Patent Number: 4,670,547

[45] Date of Patent: Jun. 2, 1987

[54] TETRAKISAZO COMPOUNDS HAVING TWO 1-HYDROXY-3- OR 4-SULFO-6- OR 7-AMINO- OR SUBSTITUTED AMINO-NAPHTHALENE COUPLING COMPONENT RADICALS THE AMINO OR SUBSTITUTED AMINO GROUPS OF WHICH ARE LINKED 1,3,5-TRIAZINE RINGS

[75] Inventor: Friedrich Lehr, Efringen-Kirchen, Fed. Rep. of Germany

[73] Assignee: Sandoz Ltd., Basel, Switzerland

[21] Appl. No.: 669,819

[22] Filed: Nov. 8, 1984

Related U.S. Application Data

[63] Continuation of Ser. No. 404,818, Aug. 3, 1982, abandoned.

[30] Foreign Application Priority Data

Aug. 8, 1981 [DE] Fed. Rep. of Germany ....... 3131560

[51] Int. Cl.[4] .................. C09B 62/01; C09B 62/03; C09B 62/09; D06P 1/382
[52] U.S. Cl. .................................. 534/637; 534/631; 534/632; 534/634; 534/635; 534/728; 534/796
[58] Field of Search ............... 260/153; 534/632, 637, 534/622, 634, 635, 631

[56] References Cited

U.S. PATENT DOCUMENTS

| | | | |
|---|---|---|---|
| 3,474,084 | 10/1969 | Griffiths et al. | 260/153 |
| 3,647,778 | 3/1972 | Andrew et al. | 260/153 |
| 3,658,782 | 4/1972 | Griffiths et al. | 260/153 |

FOREIGN PATENT DOCUMENTS

| | | | |
|---|---|---|---|
| 50-107277 | 8/1975 | Japan | 260/153 |
| 51-26386 | 3/1976 | Japan | 260/153 |
| 51-147688 | 12/1976 | Japan | 260/153 |
| 606345 | 10/1978 | Switzerland | 260/153 |
| 854432 | 11/1960 | United Kingdom | 260/153 |
| 1316437 | 5/1973 | United Kingdom | 260/153 |
| 1345146 | 1/1974 | United Kingdom | 260/153 |
| 1454210 | 11/1976 | United Kingdom | 260/153 |
| 1461125 | 1/1977 | United Kingdom | 260/153 |
| 1488952 | 10/1977 | United Kingdom | 260/153 |
| 1529645 | 10/1978 | United Kingdom | 260/153 |
| 2007250 | 5/1979 | United Kingdom | 260/153 |

Primary Examiner—Floyd D. Higel
Attorney, Agent, or Firm—Gerald D. Sharkin; Richard E. Vila; Melvyn M. Kassenoff

[57] ABSTRACT

Tetrakisazo compounds of the formula

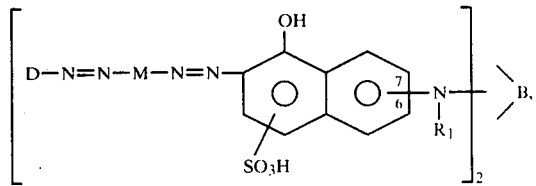

and salts thereof, wherein
B is

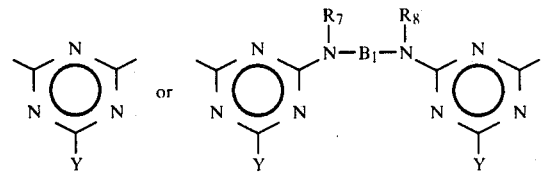

wherein
$B_1$ is a bridging radical as defined in the specification,
$R_7$ is hydrogen or $C_{1-4}$alkyl,
$R_8$ is hydrogen or $C_{1-4}$alkyl, and
each Y is independently halo, hydroxy, amino, hydroxyamino, $C_{1-4}$alkoxy, phenoxy, substituted phenoxy, an aliphatic, cycloaliphatic or aromatic amine radical or a saturated heterocyclic amine radical,
each D is independently mono-, di- or tri-sulfonaphthyl or

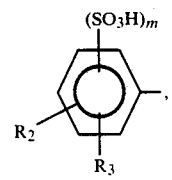

wherein
$R_2$ is hydrogen, halo, carboxy, $C_{1-4}$alkyl, $C_{1-4}$haloalkyl, $C_{1-4}$alkoxy, —COOR$_4$, ($C_{1-4}$alkyl)carbonylamino or ($C_{1-4}$alkoxy)carbonylamino, wherein R$_4$ is $C_{1-4}$alkyl, phenyl, benzyl or phenyl or benzyl substituted by 1 or 2 substituents selected from halo, $C_{1-4}$alkyl and $C_{1-4}$alkoxy,
$R_3$ is hydrogen, halo, hydroxy, $C_{1-4}$alkyl or $C_{1-4}$alkoxy, and
m is 0, 1 or 2,
each M is independently (Abstract continued on next page.)

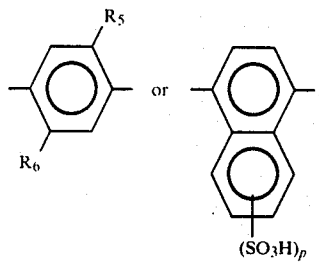

wherein
R₅ is hydrogen, halo, $C_{1-4}$alkyl, $C_{1-4}$alkoxy or sulfo,

R₆ is hydrogen, $C_{1-4}$alkyl, $C_{1-4}$alkoxy, ureido or ($C_{1-4}$alkyl)-carbonylamino, and p is 0 or 1, and each R₁ is independently hydrogen or $C_{1-4}$alkyl, with the provisos that (i) each —NR₄— radical is in the 6- or 7-position of the naphthalene ring to which it is attached, and (ii) the compound contains at least 4 sulfo groups, which are useful for dyeing and printing hydroxy group-containing and or nitrogen-containing organic substrates, especially textiles containing cellulose fibers, paper and leather. The fastness properties of the obtained dyeings may be improved by after-treating the dyed substrate with a special fixing agent.

19 Claims, No Drawings

TETRAKISAZO COMPOUNDS HAVING TWO 1-HYDROXY-3- OR 4-SULFO-6- OR 7-AMINO- OR SUBSTITUTED AMINO-NAPHTHALENE COUPLING COMPONENT RADICALS THE AMINO OR SUBSTITUTED AMINO GROUPS OF WHICH ARE LINKED 1,3,5-TRIAZINE RINGS

This application is a continuation of application Ser. No. 404,818, filed Aug. 3, 1982 and now abandoned.

This invention relates to tetrakisazo compounds containing a bridge member, processes for their preparation and their use as dyestuffs employing conventional dyeing methods and optionally aftertreating the dyed substrate with a special fixing agent.

The invention provides compounds which, in the free acid form, correspond to formula I,

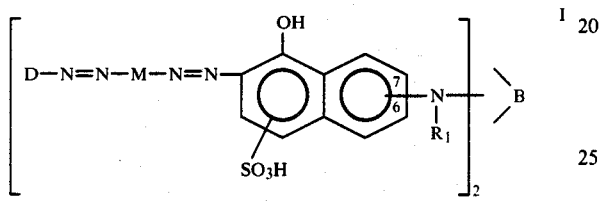

in which
each D, independently, is a radical of formula (a) or (b),

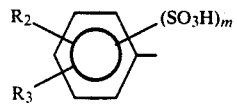  (a)

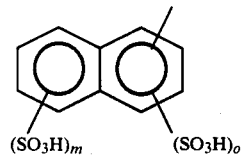  (b)

m is 0, 1 or 2,
$R_2$ is hydrogen, halogen, carboxy, $C_{1-4}$alkyl, $C_{1-4}$alkyl monosubstituted by halogen, $C_{1-4}$alkoxy, —COOR$_4$, —NHCOC$_{1-4}$alkyl or —NHCOC$_{1-4}$alkoxy,
$R_3$ is hydrogen, halogen, hydroxy, $C_{1-4}$alkyl or $C_{1-4}$alkoxy,
$R_4$ is $C_{1-4}$alkyl, phenyl, benzyl or substituted phenyl or benzyl, wherein the phenyl ring bears 1 or 2 substituents selected from halogen, $C_{1-4}$alkyl and $C_{1-4}$alkoxy,
n is 0, 1 or 2; o is 0 or 1, and
(n+0) is at least 1;
each M, independently, is a radical of formula (c) or (d),

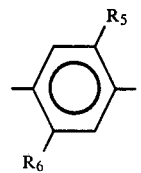  (c)

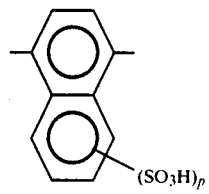  (d)

$R_5$ is hydrogen, halogen, $C_{1-4}$alkyl, $C_{1-4}$alkoxy or sulpho,
$R_6$ is hydrogen, $C_{1-4}$alkyl, $C_{1-4}$alkoxy, —NHCONH$_2$ or —NHCOC$_{1-4}$alkyl,
p is 0 or 1;
each $R_1$, independently, is hydrogen or $C_{1-4}$alkyl and each of the radicals —NR$_1$—, independently, is in the 6- or 7-position of each naphthalene radical;
B is a divalent radial of formula (e) or (f),

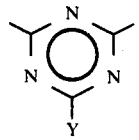  (e)

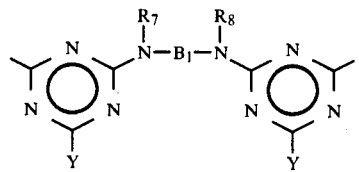  (f)

each $R_7$ and $R_8$, independently, is hydrogen or $C_{1-4}$alkyl,
each Y, independently, is halogen, —OH, —NH$_2$, —NHOH, $C_{1-4}$alkoxy, phenoxy or phenoxy substituted in the phenyl ring; an aliphatic, aromatic or cycloaliphatic amine radical or a saturated heterocyclic amine radical in which the nitrogen atom is part of the heterocycle which optionally contains further hetero atoms,
$B_1$ is $C_{2-6}$alkylene, hydroxy substituted $C_{2-6}$alkylene, $C_{5-7}$cycloalkylene, $C_{5-7}$cycloalkylene substituted by 1 to 3 $C_{1-4}$alkyl groups, unsubstituted phenylene or phenylene which is substituted by 1 or 2 substituents selected from halogen, $C_{1-4}$alkyl, $C_{1-4}$alkoxy, sulpho and carboxy; or a radical of formula (g), (h) or (i),

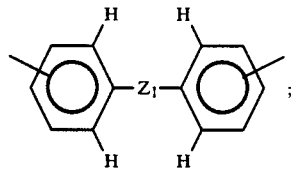  (g)

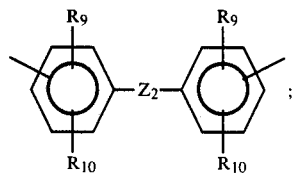  (h)

-continued

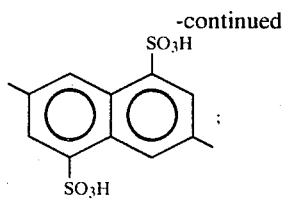

or

B₁, together with the radicals

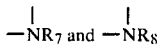

which it is bound, forms a piperazine ring,
Z₁ is —HNCONH— or —NHCO—,
Z₂ is a direct bond; —NH—, —N=N—, —O—, —CH=CH—,

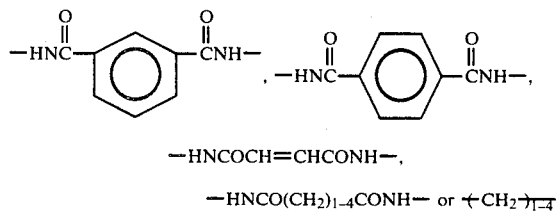

—HNCOCH=CHCONH—,

—HNCO(CH$_2$)$_{1-4}$CONH— or —(CH$_2$)$_{1-4}$—, each $R_9$, independently, is hydrogen, halogen, $C_{1-4}$alkyl, $C_{1-4}$alkoxy or sulpho, and
each $R_{10}$, independently, is hydrogen, halogen, $C_{1-4}$alkyl or $C_{1-4}$alkoxy, provided that in a compound of formula I at least four sulpho groups are present, which compounds are in free acid or salt form.

Any halogen as an alkyl substituent is fluorine, chlorine or bromine, preferably chlorine or bromine. Any halogen as a phenyl substituent is preferably chlorine or bromine, especially chlorine.

Any halogen as Y is fluorine, chlorine or bromine, especially chlorine.

Any alkyl as $R_2$ and $R_3$, independently, is preferably methyl or ethyl, more preferably methyl; any alkoxy, independently, is preferably methoxy or ethoxy, more preferably methoxy.

Where $R_2$ is a —NHCOalkyl or —NHCOalkoxy group, this group preferably contains a $C_{1-2}$alkyl or $C_{1-2}$alkoxy group, especially a methyl or methoxy group.

Any alkyl as $R_4$ is preferably methyl or ethyl. Any substituted phenyl or benzyl as $R_4$ contains a phenyl ring which is preferably substituted by 1 or 2 substituents selected from halogen, methyl and methoxy.

$R_4$ is preferably $R_{4a}$, where $R_{4a}$ is methyl, ethyl, phenyl, benzyl or substituted phenyl or benzyl with the phenyl ring containing one substituent selected from chlorine, methyl and methoxy. More preferably, $R_4$ is $R_{4b}$, where $R_{4b}$ is methyl, ethyl or benzyl.

$R_2$ is preferably $R_{2a}$, where $R_{2a}$ is hydrogen, chlorine, carboxy, $C_{1-2}$alkyl, $C_{1-2}$alkoxy, —COOR$_{4a}$ or —NHCOC$_{1-2}$alkyl. More preferably, $R_2$ is $R_{2b}$, where $R_{2b}$ is hydrogen, chlorine, carboxy, methyl, methoxy, —COOR$_{4b}$ or —NHCOCH$_3$. More preferably, $R_2$ is $R_{2c}$, where $R_{2c}$ is hydrogen, chlorine, methyl, methoxy or —NHCOCH$_3$. Even more preferably, $R_2$ is $R_{2d}$, where $R_{2d}$ is hydrogen, chlorine or methyl. Most preferably, $R_2$ is hydrogen.

$R_3$ is preferably $R_{3a}$, where $R_{3a}$ is hydrogen, chloride, hydroxy, methyl or methoxy. More preferably, $R_3$ is $R_{3b}$, where $R_{3b}$ is hydrogen, chlorine, methyl or methoxy. Most preferably, $R_3$ is hydrogen.

m is preferably 1 or 2, especially 1. Where m is 2 preferably at least one of the radicals $R_2$ and $R_3$ is hydrogen.

The preferred positions for the substituents present in the radical of formula (a) are as follows:
(1) m=2 with
 (1.1) $R_2=R_3=$H: the sulpho groups are in the 2,4-; 2,5- or 3,4-positions (relative to the azo group), especially in the 2,5-positions;
 (1.2) one of the radicals $R_2$ and $R_3$ is hydrogen and the other is other than hydrogen: the substituents are in the 2,4,5-positions with the sulpho groups preferably in the 2,5-positions;
(2) m=1 with
 (2.1) $R_2=R_3=$H: the sulpho group can be in any free position and especially is in the 4-position;
 (2.2) one of the radicals $R_2$ and $R_3$ is hydrogen and the other is other than hydrogen: same positions as given under (1.1);
 (2.3) both radicals $R_2$ and $R_3$ are other than hydrogen: the substituents are in the 2,4,5-positions with the sulpho group preferably in the 2- or 4-position;
(3) m=0 with
 (3.1) one of the radicals $R_2$ and $R_3$ is hydrogen and the other is other than hydrogen: all free positions are equivalent;
 (3.2) both radicals $R_2$ and $R_3$ are other than hydrogen: same positions as given under (1.1).

The radical (a) is preferably (a₁), wherein m is 0, 1 or 2, $R_2$ is $R_{2a}$ and $R_3$ is $R_{3a}$; more preferably, it is (a₂), wherein m is 1 or 2, $R_2$ is $R_{2b}$ and $R_3$ is $R_{3b}$, especially hydrogen; more preferably, it is (a₃), wherein m is 1, $R_2$ is $R_{2c}$ and $R_3$ is hydrogen; even more preferably, it is (a₄), wherein m is 1, $R_2$ is $R_{2d}$ and $R_3$ is hydrogen; most preferably, it is (a₅), wherein m is 1 and $R_2$ and $R_3$ are both hydrogen.

The preferred positions of the sulpho groups present in the radical of formula (b) are as follows:
(4) azo group bound to the 1-position of the naphthalene radical:
 (4.1) n+o=2: the sulpho groups are in the positions 3,6; 3,8; 4,6; or 4,8;
 (4.2) n+o=3: the sulpho groups are in the positions 3,6,8;
(5) azo group bound to the 2-position of the naphthalene radical:
 (5.1) n+o=2: the sulpho groups are in the positions 1,5; 3,6; 4,8; 5,7 or 6,8; especially in the 4,8-positions;
 (5.2) n+o=3: the sulpho groups are in the positions 3,6,8; 4,6,8 or 1,5,7; especially in the 3,6,8- or 4,6,8-positions.

The radical (b) is preferably (b₁), wherein the azo group is bound to the 2-position and n+o=2 according to (5.1) or n+o=3 according to (5.2); more preferably, it is (b₂), wherein the azo group is bound to the 2-position and n+o=2 according to (5.1).

Each D, independently, is preferably D₁, where D₁ is a radical (a₁) or (b₁); more preferably, it is D₂, where D₂ is a radical (a₂) or (b₂); more preferably, it is D₃, where D₃ is a radical (a₃); even more preferably, it is D₄, where D₄ is a radical (a₄); most preferably, it is D₅, where D₅ is a radical (a₅).

Any alkyl as $R_5$ and $R_6$, independently, is preferably methyl or ethyl, especially methyl; any alkoxy is preferably methoxy or ethoxy, especially methoxy.

Where $R_6$ is —NHCOC$_{1-4}$alkyl, it is preferably —NHCOC$_{1-2}$alkyl, especially —NHCOCH$_3$.

$R_5$ is preferably $R_{5a}$, where $R_{5a}$ is hydrogen, chlorine, methyl, methoxy or SO$_3$H; more preferably, it is $R_{5b}$, where $R_{5b}$ is hydrogen, methyl, methoxy or —SO$_3$H; even more preferably, it is $R_{5c}$, where $R_{5c}$ is hydrogen or —SO$_3$H; most preferably, $R_5$ is —SO$_3$H.

$R_6$ is preferably $R_{6a}$, where $R_{6a}$ is hydrogen, methyl, methoxy, —NHCONH$_2$ or —NHCOCH$_3$; more preferably, it is $R_{6b}$, where $R_{6b}$ is hydrogen, methyl, methoxy or —NHCOCH$_3$; most preferably, $R_6$ is hydrogen.

The radical (c) is preferably (c$_1$), wherein $R_5$ is $R_{5a}$ and $R_6$ is $R_{6a}$; more preferably, it is (c$_2$), wherein $R_5$ is $R_{5b}$ and $R_6$ is $R_{6b}$; even more preferably, it is (c$_3$), wherein $R_5$ is $R_{5c}$ and $R_6$ is hydrogen; most preferably, it is (c$_4$) of formula

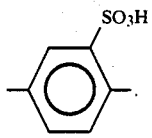

(c$_4$)

Where, in the radical (d), p is 1, the sulpho group is preferably in the 6- or 7-position. More preferably, p is 0.

The radical (d) is preferably (d$_1$), where p is 0.

Each M, independently, is preferably $M_1$, where $M_1$ is a radical (c$_1$) or (d$_1$); more preferably, it is $M_2$, where $M_2$ is a radical (c$_2$) or (d$_1$); even more preferably, it is $M_3$, where $M_3$ is a radical (c$_3$); most preferably, it is $M_4$, where $M_4$ is a radical (c$_4$).

In the naphthylamine radicals linked through the bridge —B— the sulpho group is preferably in the 3-position and the —NR$_1$— radical is preferably in the 6-position.

Any alkyl as $R_1$, $R_7$ and $R_8$, independently, is preferably methyl or ethyl, especially methyl.

$R_1$, $R_7$ and $R_8$, independently, are preferably $R_{1a}$, $R_{7a}$ and $R_{8a}$, which are hydrogen or methyl, especially hydrogen.

Any alkoxy as Y is preferably methoxy. Any substituted phenoxy is preferably substituted in the phenyl ring by 1 or 2 substituents selected from halogen, methyl and methoxy.

When Y is an aliphatic amino group it is preferably a monoalkyl- or dialkyl-amino group in which the alkyl group contains 1 to 4 carbon atoms and is straight chain or branched and is optionally substituted by halogen, phenyl, carboxy or preferably sulpho or hydroxy.

Any cycloaliphatic amine radical as Y is preferably a C$_{5-6}$cyclo alkylamino group, especially a cyclohexylamino group.

Any aromatic amine radical is preferably phenylamino in which the phenyl ring is optionally substituted by 1 or 2 substituents selected from halogen, C$_{1-4}$alkyl, C$_{1-4}$alkoxy, hydroxy phenoxy, carboxy, sulpho, —NHCOC$_{1-4}$alkyl and —(CH$_2$)$_q$—PO(OH)$_2$, wherein q is an integer 0 to 4.

Any heterocyclic amine radical as Y is preferably morpholine which is bound through the N-atom, piperidine, piperazine or pyrrolidine.

Y is preferably $Y_1$, where $Y_1$ is chlorine, fluorine, —OH, —NH$_2$, —NHOH, mono-C$_{1-4}$alkylamino, di-C$_{1-2}$alkylamino; mono- or di-C$_{2-3}$alkylamino in which the alkyl groups are monosubstituted by —OH, sulpho or carboxy; phenylamino in which the phenyl ring is optionally substituted by 1 or 2 substituents selected from sulpho, carboxy, —OH, chlorine, methyl, methoxy, —NHCOCH$_3$ and —(CH$_2$)$_{q'}$—PO(OH)$_2$ (wherein q' is 0 or 1); or N-morpholino; more preferably, it is $Y_2$, where $Y_2$ is chlorine, —OH, —NH$_2$, 2-hydroxy- or 2-sulphoethylamino, 2- or 3-hydroxypropylamino, bis(2-hydroxyethyl)amino, phenylamino, 3- or 4-sulphophenylamino or

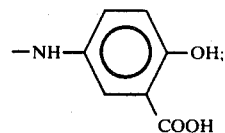

more preferably, it is $Y_3$, where $Y_3$ is chlorine, —NH$_2$, 2-hydroxy- or 2-sulphoethylamino, phenylamino or 3- or 4-sulphophenylamino; even more preferably it is $Y_4$, where $Y_4$ is chlorine, —NH$_2$ or 3-sulphophenylamino; most preferably, Y is chlorine.

The radical (e) is preferably (e$_1$), wherein Y is $Y_1$; more preferably, it is (e$_2$), wherein Y is $Y_2$; more preferably, it is (e$_3$), wherein Y is $Y_3$; most preferably, it is (e$_4$), wherein Y is $Y_4$, especially chlorine.

Any alkylene as $B_1$ may be straight chain or branched; preferably any alkylene is linear and then is C$_{2-4}$alkylene or hydroxy-C$_{3-6}$alkylene (wherein the hydroxy group is bound to a carbon atom other than C$_1$). Any cycloalkylene as $B_1$ is preferably cyclohexylene which preferably is unsubstituted.

Any substituted phenylene as $B_1$ preferably bears 1 or 2 substituents selected from chlorine, methyl, methoxy, sulpho and carboxy; more preferably the phenylene bears only one of these substituents. Most preferably the phenylene is unsubstituted and is particularly unsubstituted 1,4-phenylene.

$Z_1$ is preferably —NHCONH—.

The radical (g) is preferably (g$_1$), where (g$_1$) is the radical of the formula

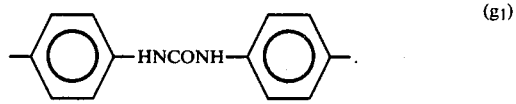

(g$_1$)

Any alkyl and alkoxy as $R_9$ and $R_{10}$ independently contains preferably 1 or 2 carbon atoms and is most preferably methyl and methoxy.

$R_9$ is preferably, $R_{9a}$, where $R_{9a}$ is hydrogen, methyl, methoxy or sulpho; most preferably it is $R_{9b}$, where $R_{9b}$ is hydrogen or sulpho.

$R_{10}$ is preferably $R_{10a}$, where $R_{10a}$ is hydrogen, methyl or methoxy; most preferably $R_{10}$ is hydrogen.

$Z_2$ is preferably, $Z_{2a}$, where $Z_{2a}$ is a direct bond, —NH—, —CH=CH—, —HNCOCH=CHCONH—, —HNCOCH$_2$CH$_2$CONH— or —CH$_2$CH$_2$—. More preferably, it is $Z_{2b}$, where $Z_{2b}$ is a direct bond, —NH—, —CH=CH— or —CH$_2$CH$_2$—. Most preferably, it is $Z_{2c}$, where $Z_{2c}$ is —CH=CH— or —CH$_2$CH$_2$—.

The radical (h) is preferably (h$_1$) of formula

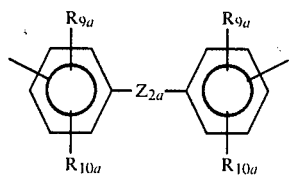 (h₁)

; more preferably, it is (h₂) of formula

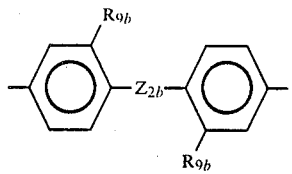 (h₂)

; more preferably, it is (h₃) of formula

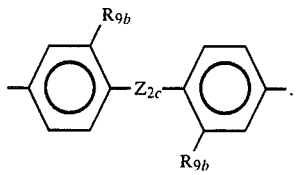 (h₃)

In the radicals (h₁), (h₂) and (h₃) the groups $R_{9a}$, $R_{10a}$ and $R_{9b}$, respectively, may be the same or different and preferably are the same.

$B_1$ is preferably $B_{1a}$, where $B_{1a}$ is linear or branched $C_{2-4}$alkylene or hydroxy-$C_{3-6}$alkylene; cyclohexylene, phenylene, phenylene monosubstituted by chlorine, methyl, methoxy, sulpho or carboxy, a radical of formula (g₁), (h₁) or (i) or together with the

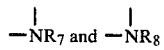
—NR₇ and —NR₈ groups forms a piperazine ring. More preferably it is $B_{1b}$, where $B_{1b}$ is 1,4-phenylene, 1,4-phenylene monosubstituted by chlorine, methyl, methoxy, sulpho or carboxy; or a radical of formula (g₁) or (h₂). Even more preferably, it is $B_{1c}$, where $B_{1c}$ is 1,4-phenylene or a radical of formula (h₃). Most preferably, $B_1$ is 1,4-phenylene.

The radical (f) is preferably (f₁), wherein each Y, independently, is Y₃; each R₇ and R₈, independently, is $R_{7a}$ and $R_{8a}$, and $B_1$ is $B_{1a}$. More preferably, it is (f₂), wherein each Y, independently, is Y₃; each R₇ and R₈, independently, is $R_{7a}$ and $R_{8a}$, and $B_1$ is $B_{1b}$. Even more preferably, it is (f₃), wherein each Y is Y₄ (both Y's being identical), R₇ and R₈ are hydrogen, and $B_1$ is $B_{1c}$. Most preferably, it is (f₄), wherein each Y is chlorine, R₇ and R₈ are hydrogen, and $B_1$ is 1,4-phenylene.

B is preferably $B_a$, where $B_a$ is a radical of formula (e₁) or (f₁). More preferably, it is $B_b$, where $B_b$ is a radical (e₂) or (f₂). Even more preferably, it is $B_c$, where $B_c$ is a radical of (e₃) or (f₃). Most preferably, it is $B_d$, where $B_d$ is a radical (e₄), especially with Y₄ as chlorine, or a radical (f₄).

A compound of formula I with a radical (a) as D contains preferably 6 to 10, especially 6 to 8, sulphonic acid groups. A compound of formula I with a radical (b) as D contains preferably 6 to 12, especially 6 to 10, sulphonic acid groups.

Preferred compounds correspond, in the free acid form, to formula Ia,

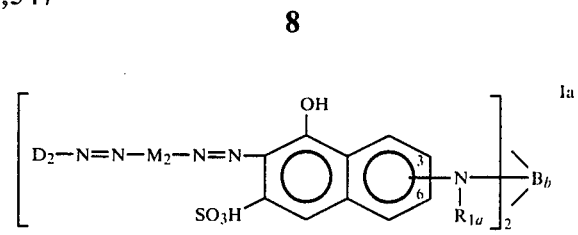

in which each D₂, M₂ and $R_{1a}$ as well as the position to which the group —NR$_{1a}$— is bound may be the same or different and are preferably the same. Further preferred compounds of formula Ia, in which the chromophores linked through the bridge member $B_b$ are identical, are those wherein (1) $R_{1a}$ is hydrogen;
(2) those of (1) wherein D₂ is D₃;
(3) those of (1) wherein M₂ is M₃;
(4) those of (1) wherein the group

—NR$_{1a}$ is in the 6-position;
(5) those of (1) to (4) wherein $B_b$ is $B_c$;
(6) those of (5) wherein D₂ is D₄, especially D₅, M₂ is M₄ and $B_b$ is $B_d$.

When the compounds of formula I are in the salt form, the cations of the sulpho and/or carboxy groups are not critical and may be any of those non-chromophoric cations conventional in the field of anionic direct dyestuffs. Generally, in a compound of formula I the cations of the sulpho and/or carboxy groups may be the same or different, e.g. the compound may be in a mixed salt form.

Examples of such cations are alkali metal cations and cations of the ammonium type including unsubstituted and substituted ammonium cations e.g., lithium, sodium, potassium, ammonium, mono-, di-, tri- and tetramethylammonium, triethylammonium and mono-, di- and tri-ethanolammonium.

The preferred cations are the alkali metal cations and ammonium, with sodium being the most preferred.

The present invention further provides a process for the preparation of compounds of formula I comprising reacting the following components:

diazotized amino-monoazo compounds of formula II, $$D-N=N-M-NH_2 \qquad II$$

coupling components of formula III,

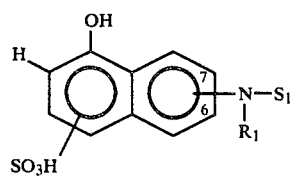

in which S₁ is hydrogen or a conventional protecting group which is to be split off before any condensation reaction, triazine compounds of formula IV,

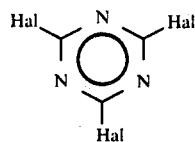  IV in which Hal is halogen, optionally a base or compounds of formula H—$Y_a$, in which $Y_a$ has one of the significances of Y with the exception of —OH and halogen, and/or a corresponding diamine or diamine/acid dichloride to introduce the bridge member of formula (g) or (h) with $Z_2$ as —HNCOCH=CH-CONH—,

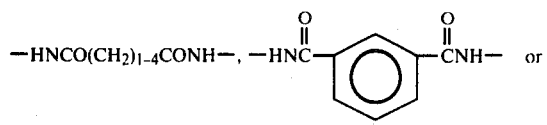

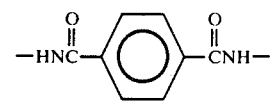

may also preferably be prepared by reacting 2 moles of a compound of formula VII

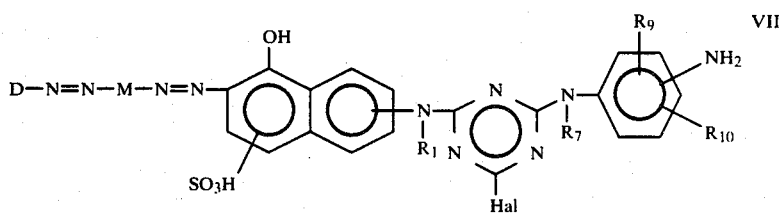  VII

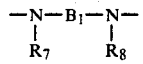

which components must be present in the corresponding stoichiometric molar ratio to obtain a compound of formula I by coupling and condensing in any desired order.

Diazotization and coupling reactions may be effected in conventional manner. Preferably, coupling is carried out at pH 4–7, especially 5–6, and at temperatures of 0°–5° C.

The replacement of the halogen atoms in a compound of formula IV by separate condensation steps may be effected in conventional manner. The optional replacement of the third halogen atom with another group Y normally is carried out at the preferred temperature range from 70° to 100° C., especially from 85° to 95° C., and at the preferred pH range from 7 to 10, especially at pH 8 to 9.

Compounds of formula I which have identical chromophores linked through a bridge member B which is a radical of formula (f) may be preferably be prepared by reacting 2 moles of a compound of formula V

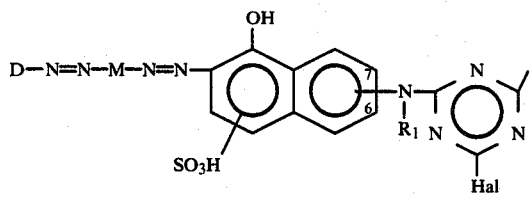  V with 1 mole of a diamine of formula VI

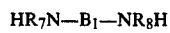  VI.

Those compounds of formula I having identical chromophores linked through a bridge member B which is a radical of formula (f), wherein $B_1$ is a radical with 1 mole of a corresponding acid dichloride.

The reaction of a compound of formula V with a diamine of formula VI may be carried out in accordance with known condensation methods; preferably, the reaction is carried out at pH 6 to 8 and at room temperature to 40° C.

The reaction in the presence of an acid dichloride is carried out in accordance with conventional methods, preferably at pH 5 to 6 and at temperatures from 5° to 15° C.

According to these two variants of production compounds of formula I in which Y is halogen are obtained. The replacement of the halogen atom with another group Y may be effected in conventional manner e.g., as described above.

The compounds of formula I may be isolated in accordance with known methods, for example by salting out, filtering and drying in vacuo.

The starting materials of formulae II and III and the compounds of the formula H—$Y_a$ as well as the diamines of formula VI are either known or may be prepared in accordance with known methods from available starting materials.

The compounds of formula I and mixtures thereof which are preferably in salt form are useful for dyeing or printing hydroxy-group- or nitrogen-containing organic substrates. Preferred substrates are paper, leather and textiles comprising or consisting of cellulose fibres, such as cotton.

The compounds according to the invention show high affinity for the substrates and therefore are good direct dyes. Those compounds containing a halogen atom in the triazine bridging member which can be split off are also useful as reactive dyestuffs.

Dyeing and printing with the dyes of the invention may be carried out in accordance with known methods. Dyeing of natural or regenerated cellulose such as cotton is preferably carried out according to the conventional exhaust dyeing method using temperatures from 20°–50° C. and 80°–100° C.

The dyestuffs of the invention give deep dyeings and have good exhaust- or fixation-yields. The dyeings obtained, especially on cotton and paper, are brilliant.

Dyeings and prints obtained exhibit good wet fastnesses and good light fastness. Furthermore, they show good fastness to peroxide, perborate and chlorine. For those dyeings obtained with reactive dyes it is notable that the unfixed dyestuff can be easily washed off the substrate.

The wet-fastness properties of the direct- or reactive-dyestuffs on cellulose fibres containing textile material may be notably improved by a special resin after-treatment with selected auxiliaries. Particularly, this treatment gives improved wash-fastness properties, allowing repeated washing at high temperatures.

Suitable for applying to the dyed or printed substrate is a fixing agent comprising a precondensate or mixture of either (A) the product of reacting a mono- or polyfunctional primary or secondary amine with cyanamide, dicyandiamide, guanidine or bisguanidine; or ammonia with cyanamide or dicyandiamide, said product (A) containing reactive hydrogen atoms bound to nitrogen, or (B) a quaternary polyalkylene polyamine with (C) an N-methylol derivative of a urea, melamine, guanamine, triazinone, urone, carbamate or acid amide, optionally together with (D) a catalyst for the crosslinking of N-methylol compounds of the type (C) above.

Details concerning the fixing agent as a combination of (A), (C) and (D) and its use are described in British Patent Application No. 2 070 006 A; details concerning the combination (B), (C) and (D) are described in British Patent Application No. 2 084 597 A.

The following Examples further serve to illustrate the invention. In the Examples all parts and percentages are by weight and all temperatures are in degrees Centigrade.

EXAMPLE 1

64.3 Parts of 4-amino-1,1'-azobenzene-3,4'-disulphonic acid are dissolved in 500 parts water with the addition of 30% sodium hydroxide solution. To this solution 39.6 parts of the sodium salt of naphthalene-2-sulphonic acid and 48 parts of 30% hydrochloric acid are added. The mixture is cooled to 0° and 45 parts of 4N sodium nitrite solution are added dropwise over 5 to 10 minutes. Stirring is effected for 15 minutes and the excess nitrous acid is destroyed by adding a small quantity of amidosulphonic acid. Subsequently, the pH is adjusted to 5.0–5.5 by addition of 10 to 15 parts sodium bicarbonate.

A suspension of 57 parts 2-chloro-4,6-bis-(5'-hydroxy-7'-sulphonaphthyl-2'-amino)-1,3,5-triazine in form of the disodium salt in 600 parts water, which is cooled to 0°–2° to which 32 parts sodium bicarbonate have been added, is pumped immediately to the above obtained diazo compound, at a rate such that the temperature does not exceed 5°. The mixture is then stirred for 1 hour at 0°–5°. During a further hour the reaction mixture is raised to room temperature and the pH is adjusted to 8.5. Approximately 120 parts of a ca. 16% aqueous sodium hypochlorite solution are added to the thus obtained dyestuff solution. The pH is adjusted to 7–8, and the mixture is heated to 65° and salted out with 28 parts sodium chloride per 100 parts solution. The obtained dyestuff which is filtered at 60° and dried in vacuo at 70°–80° corresponds, in the free acid form, to the formula

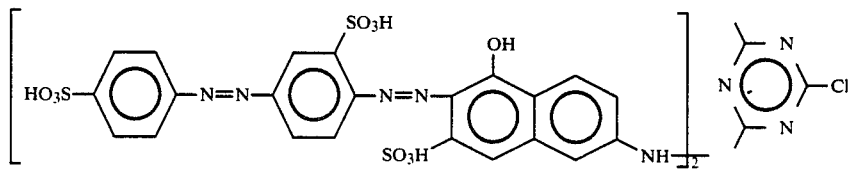

and gives cotton dyeings of a bluish red shade having good fastness properties.

In the following Table 1 further compounds corresponding, in the free acid form, to the formula

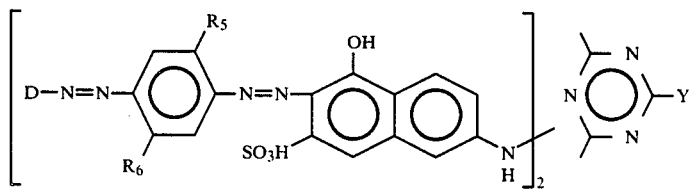

are listed. They may be prepared in accordance with the method described in Example 1 using appropriate starting materials. For those compounds wherein Y in the triazine bridge is other than halogen, a further condensation step is necessary comprising reacting the corresponding compound with Y=halogen with sodium hydroxide, ammonia or an aqueous amine solution. This replacement normally is carried out at 85°–95° and at a pH of 8 to 9.

In the last column I of Table 1 the shade of the dyeing on cotton is given, whereby a=red; b=bluish red; c=violet.

The cotton dyeings obtained with the dyestuffs of Table 1 show notably good wet fastnesses.

TABLE 1

| Ex. No. | D | $R_5$ | $R_6$ | Y | I |
|---|---|---|---|---|---|
| 2 | 4-HO₃S-C₆H₄- | SO₃H | H | OH | b |
| 3 | " | " | H | NH₂ | b |
| 4 | 3-HO₃S-C₆H₄- | " | H | Cl | b |
| 5 | " | " | H | —NH—C₆H₃(3-SO₃H) | b |
| 6 | 4-HO₃S-C₆H₄- | " | H | —NHCH₂CH₂OH | b |
| 7 | " | " | H | —N(CH₂CH₂OH)₂ | b |
| 8 | " | " | H | —NHCH₂CH₂SO₃H | b |
| 9 | " | " | H | —N(CH₃)CH₂CH₂SO₃H | b |
| 10 | " | " | H | —N(morpholino, i.e. —N(CH₂CH₂)₂O) | b |
| 11 | " | " | H | —NH—C₆H₅ | b |
| 12 | " | " | H | —NH—C₆H₄—NHCOCH₃ | b |
| 13 | " | " | H | —NH—C₆H₄—SO₃H (meta) | b |
| 14 | " | " | H | —NH—C₆H₄—SO₃H (para) | b |
| 15 | " | " | H | —NH—C₆H₄—COOH | b |

TABLE 1-continued

| Ex. No. | D | R₅ | R₆ | Y | I |
|---|---|---|---|---|---|
| 16 | " | " | H | −NH−C₆H₃(OH)(COOH)− (phenyl with OH and COOH) | b |
| 17 | " | " | H | −NH−C₆H₄−PO(OH)₂ | b |
| 18 | " | " | H | −NH−C₆H₄−CH₂PO(OH)₂ | b |
| 19 | 2,4-disulfophenyl (SO₃H at 2 and 4) | H | H | Cl | b |
| 20 | 5-chloro-2,4-disulfophenyl | H | H | NH₂ | b |
| 21 | 2-methyl-4-sulfophenyl (H₃C, HO₃S) | SO₃H | H | −NH−C₆H₄−SO₃H | b |
| 22 | 2,4-disulfophenyl | H | CH₃ | Cl | b |
| 23 | " | OCH₃ | CH₃ | −NH−C₆H₅ | b |
| 24 | 1,5-disulfo-naphthyl (SO₃H at 1 and 5) | H | CH₃ | Cl | c |
| 25 | " | H | H | Cl | c |
| 26 | " | OCH₃ | H | Cl | c |

EXAMPLE 27

142.8 Parts 4-amino-1,1'-azobenzene-3,4'-disulphonic acid are dissolved in 1000 parts water by addition of 30% sodium hydroxide solution. 106 Parts 30% hydrochloric acid are added and the solution is brought to 0° by external cooling and adding ice. Within 5 to 10 minutes 100 parts 4 N sodium nitrite solution are added dropwise. After 15 minutes stirring the excess nitrous acid is destroyed by adding a small quantity of amidosulphonic acid.

The thus obtained diazo suspension is pumped within 10 minutes into 121.2 parts of a solution containing the sodium salt of 2-acetamido-5-hydroxy-7-naphthalenesulphonic acid which has been cooled to 0° and adjusted at pH 5.7 to 5.9 by adding glacial acetic acid. During the addition, the temperature is held at or below 5°. Stirring is effected for 10 minutes and the pH is raised to 5–5.5 by slowly adding 65 parts sodium bicarbonate within 30–40 minutes. The reaction mixture is raised to room temperature over 1 hour and the pH is adjusted to 12 by parts ice, 100 parts water and 11 parts cyanuric chloride, at a rate such that the temperature does not exceed 8°. The pH is maintained at 6 by adding simultaneously 20% sodium carbonate solution. The mixture is raised to room temperature at pH 6–7 within 2 hours, then 3.2 parts p-phenylenediamine are added. After 2 hours stirring (1 hour at 40°) at pH 8 which is held by addition of 20% sodium carbonate solution, the reaction mixture is heated to 60°. Then, sodium chloride (18 parts per 100 parts solution) is added to the solution to salt out the product which is filtered at 50°–60° and dried in vacuo at 70°–80°. The obtained dyestuff which corresponds, in the free acid form, to the formula

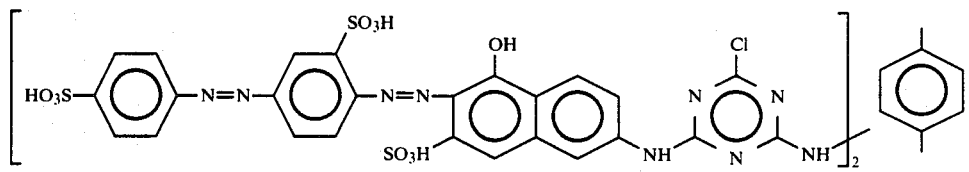

addition of 30% sodium hydroxide solution. Subsequently, 150 parts of a 16% aqueous sodium hypochlorite solution are added within 20 minutes. After 1 hour 200 parts 30% sodium hydroxide solution are added and the mixture is heated to 85°–90° for ca. 4 hours. The solution is then neutralized at 70° by adding 30% hydrochloric acid and sodium chloride is added portionwise (22 parts per 100 parts solution) at the same temperature. Filtration is carried out at 65° and the product is dried in vacuo at 80°.

40.4 Parts of the obtained dyestuff in form of the trisodium salt are suspended in 800 parts water and are pumped within ca. 30 minutes into a mixture of 100 and gives dyeings on cotton of a brilliant red shade. The dyeings show notably good wet-fastness properties.

Further dyestuffs which may be prepared in accordance with the method given in Example 27 are listed in the following Table 2. They correspond, in the free acid form, to the formula

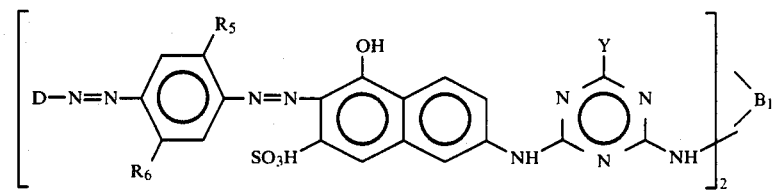

The last column I of Table 2 gives the shade of the dyeings on cotton (where the same letters are used as for Table 1).

An optional replacement of the chlorine atom in the triazinyl bridge may be carried out in an analogous method as described for the Examples of Table 1.

TABLE 2

| Ex. No. | D | $R_5$ | $R_6$ | Y | $B_1$ | I |
|---|---|---|---|---|---|---|
| 28 | HO₃S—⟨phenyl⟩— | SO₃H | H | OH | —⟨phenyl⟩— | a |
| 29 | " | " | H | NH₂ | " | a |
| 30 | " | " | H | —NHCH₂CH₂OH | " | a |
| 31 | " | " | H | —NHCH₂CH₂SO₃H | " | a |
| 32 | " | " | H | —N(H)(OH) | " | a |
| 33 | " | " | H | —NH—⟨phenyl⟩—SO₃H | " | a |

TABLE 2-continued

| Ex. No. | D | R$_5$ | R$_6$ | Y | B$_1$ | l |
|---|---|---|---|---|---|---|
| 34 | 3-SO$_3$H-phenyl | " | H | " | " | a |
| 35 | " | " | H | Cl | " | a |
| 36 | 2-methyl-4-SO$_3$H-phenyl (with SO$_3$H at 5) | H | H | —NH-(3-SO$_3$H-phenyl) | 1,4-phenylene | b |
| 37 | " | H | H | Cl | " | b |
| 38 | " | H | —NHCOCH$_3$ | Cl | " | c |
| 39 | 5-Cl-2,4-di-SO$_3$H-phenyl | H | H | Cl | " | b |
| 40 | " | H | H | NH$_2$ | " | b |
| 41 | 2-methyl-4-SO$_3$H (HO$_3$S at position) phenyl | SO$_3$H | H | Cl | " | a |
| 42 | 1,5-di-SO$_3$H-3-methyl-naphthyl | H | CH$_3$ | Cl | " | c |
| 43 | " | H | H | Cl | " | c |
| 44 | " | H | H | NH$_2$ | " | c |
| 45 | 4-HO$_3$S-phenyl | SO$_3$H | H | Cl | 4,4'-stilbene-2,2'-disulfonic acid | a |
| 46 | " | " | H | OH | " | a |
| 47 | " | " | H | NH$_2$ | " | a |
| 48 | " | " | H | —NHCH$_2$CH$_2$SO$_3$H | " | a |
| 49 | " | " | H | —NHCH$_2$CH$_2$OH | " | a |
| 50 | 4-HO$_3$S-phenyl | SO$_3$H | H | —NH-phenyl | 4,4'-stilbene-2,2'-disulfonic acid | a |

… TABLE 2-continued
| Ex. No. | D | $R_5$ | $R_6$ | Y | $B_1$ | l |
|---|---|---|---|---|---|---|
| 51 | " | " | H | 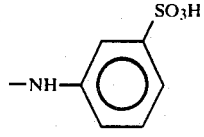 | " | a |
| 52 | " | H | H | Cl | " | b |
| 53 | " | H | $CH_3$ | Cl | " | b |
| 54 | 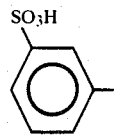 | $SO_3H$ | H | Cl | " | a |
| 55 | " | " | H | $NH_2$ | " | a |
| 56 | 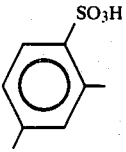 | H | H | Cl | " | b |
| 57 | " | H | H | $NH_2$ | " | b |
| 58 | " | H | $-NHCOCH_3$ | Cl | " | c |
| 59 |  | H | $CH_3$ | Cl | " | c |
| 60 |  | H | H | Cl | 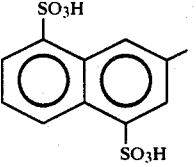 | b |
| 61 | " | H | H | Cl | 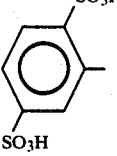 | b |
| 62 | 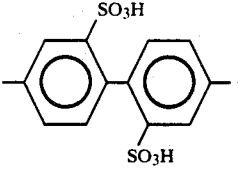 | $SO_3H$ | H | Cl | " | a |
| 63 | 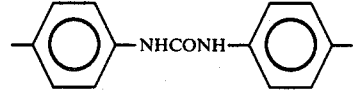 | $SO_3H$ | H | Cl | 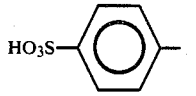 | a |
| 64 | " | " | H | Cl | 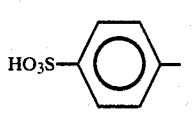 | a |
| 65 | " | " | H | Cl | 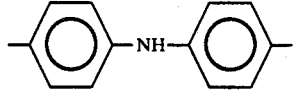 | a |

TABLE 2-continued

| Ex. No. | D | $R_5$ | $R_6$ | Y | $B_1$ | 1 |
|---|---|---|---|---|---|---|
| 66 | " | " | H | Cl | ![structure with two phenyl rings connected by CH2CH2, each with SO3H] | a |
| 67 | " | " | H | $-NH-\bigcirc$ | " | a |

EXAMPLE 68

In accordance with the method described in Example 27 but using for the last step instead of p-phenylenediamine the corresponding amount of piperazine the dyestuff which, in the free acid form, corresponds to the formula

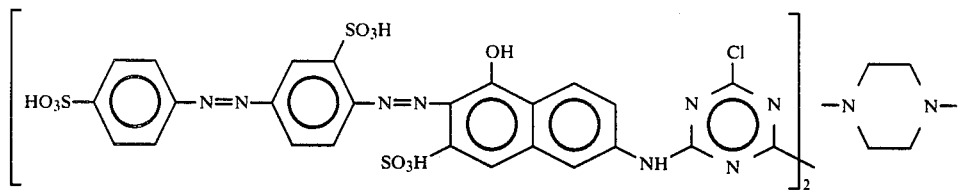

may be prepared. It gives dyeings on cotton of a red shade. The dyeings show good wet-fastness properties.

EXAMPLE 69

According to the method described in Example 27 and employing 3-acetamido-5-hydroxy-7-naphthalenesulphonic acid as coupling component the dyestuff which, in the free acid form, corresponds to the formula

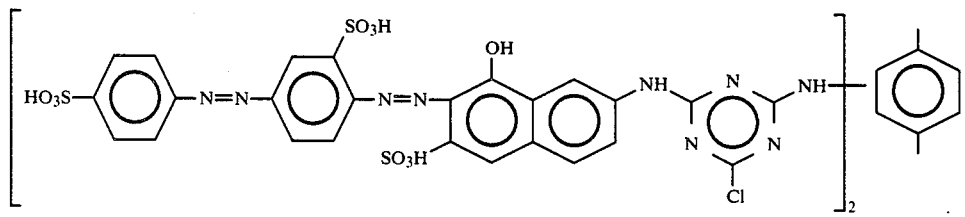

is obtained. It gives dyeings on cotton of a violet shade; these dyeings show good wet-fastness properties.

EXAMPLES 70

20.2 Parts of the dyestuff intermediate of the formula

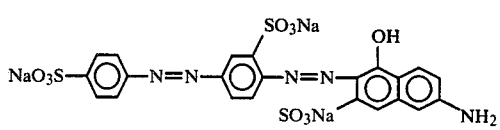

prepared according to the method as described in Example 27 are suspended in 400 parts water and are added dropwise at 0°–8° to a mixture of 5.5 parts cyanuric chloride and 100 parts ice water within 30 minutes. Simultaneously, 20% sodium carbonate solution is added to keep the pH at 6. Maintaining the pH at 6–7, the temperature of the mixture is allowed to rise to room temperature within 2 hours, then 5.7 parts 1,4-diaminobenzene-2-sulphonic acid are added. The reaction mixture is stirred at pH 8 for 1 hour at room temperature and for a further hour at 40°. With the addition of sodium chloride (26%) at 60° the product is salted out and then filtered at 50°–60°.

One half of the obtained presscake is dissolved in 250 parts water, cooled to 10°–12°, and the pH is adjusted to 6 by adding 10% hydrochloric acid. Within 30 minutes a mixture consisting of 1 part fumaric acid dichloride and 4 parts chlorobenzene is added dropwise and the reaction mixture is stirred for 1 to 2 hours whilst the pH is kept at 5.5–6 by addition of lithium carbonate in portions. Subsequently, the mixture is heated to 70° and is salted out by addition of sodium chloride (15%) at pH 7–8. The precipitated dyestuff is filtered at 60° and dried in vacuo. The dyestuff which, in the free acid form, corresponds to the formula

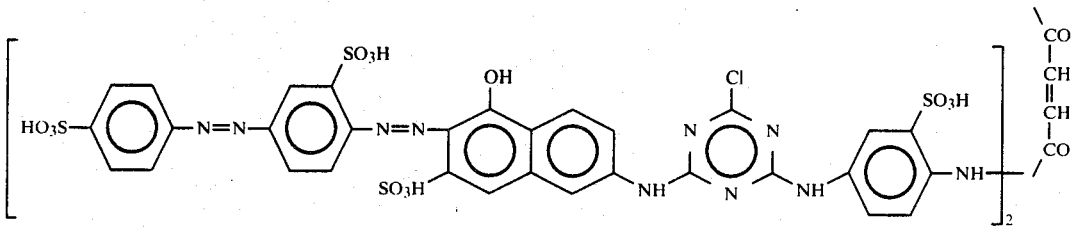

gives dyeings on cotton of a red shade. These dyeings show good wet-fastness properties.

The dyestuffs of Examples 1 to 70 are obtained in the sodium salt form. They may, depending on the reaction-/isolation conditions or by reacting the sodium salts in accordance with known methods, also be obtained in free acid form or in other salt forms, for example those salt forms indicated in the description hereinbefore.

In the following examples the application of the dyestuffs of this invention is illustrated.

APPLICATION EXAMPLE A 0.5 Parts of the dye of Example 45 are dissolved in 200 parts water at 60°. 10 Parts cotton fabric, 16 parts Glauber's salt and 4 parts sodium carbonate are subsequently added to the dyebath. The bath is raised to 98° over 45 minutes.

Dyeing is continued for 1 hour at 98°. During dyeing, the water that evaporates is continuously replaced. The dyed fabric is then removed from the liquor, rinsed with cold and hot water, soaped at the boil during 20 minutes in 500 parts water and 0.5 parts sodium alkylsulphonate, rinsed again and dried. A red dyeing having good light- and wet-fastnesses and good fastness to chlorine is obtained.

APPLICATION EXAMPLE B 0.5 Parts of the dye of Example 27 are dissolved in 200 parts demineralized water. 10 Parts cotton cretonne (bleached) are added to the dyebath of 50°-60° and the bath is raised to 98° within 30 minutes. Then 1 part and after 10 minutes further 2 parts calcinated Glauber's salt are added maintaining the temperature at 98° for further 35 minutes. Subsequently, it is cooled to 80° within 15 minutes. During the dyeing procedure, the water that evaporates is replaced with demineralized water at 98°. The dyed fabric is rinsed with running cold water, centrifuged and dried at 80°. A red dyeing with good light- and wet-fastness properties is obtained.

APPLICATION EXAMPLE C

A cotton fabric dyed with a 1/1 standard depth dyeing of the dyestuff of Example 27 is padded with an aqueous solution containing 100 g/l of a fixing agent which is a mixture given below and squeezed out to give a pick-up of about 80%. The fabric is then shock-dried on a tension frame at 175°-180° in such a way that the cross-linking time of the dry fabric is 30-45 seconds at this temperature.

The fixing agent is a reaction product (at 70° during 3 hours) of (A) 68.5 parts of a spray-dried solution at pH 7.5 which has been obtained by condensation of 103 parts diethylene triamine with 84 parts dicyandiamide at 110° (→160°) and subsequent stepwise neutralisation with 44.6% sulphuric acid with the addition of ice, and (C) 457 parts of a 50% solution of dimethyloldihydroxyethylene urea heated to 70°.
to which 23 parts dicyandiamide as stabilizing agent are added. This product may be used as such or together with a catalyst for the cross-linking e.g. magnesium chloride.

The obtained red cotton dyeing fixed in such a way exhibits excellent wash-fastness and withstands repeated 60° washes and even a wash at the boil. At the same time a clear improvement of crease resistance is obtained, and the swelling value of the cellulose fibres is reduced.

APPLICATION EXAMPLE D

Instead of the fixing agent used in Application Example C it is also possible to employ the water-soluble precondensate which is obtained by reacting (B) 100 parts of a 50% aqueous solution of the reaction product of epichlorohydrin and dimethylamine with (C) 150 parts of a 50% aqueous solution of dimethyloldihydroxyethylene urea in the presence of (D) 20 parts magnesium chloride.hexahydrate
at 70° during 30 minutes.

The resulted red cotton dyeing after-treated in such a way shows excellent wash-fastness. At the same time a clear improvement of crease resistance is obtained, and the swelling value of the cellulose fibres is reduced.

What we claim is:

1. A compound of the formula

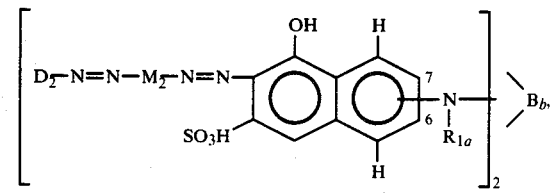

or a salt thereof each cation of which is independently a non-chromophoric cation, wherein $B_b$ is

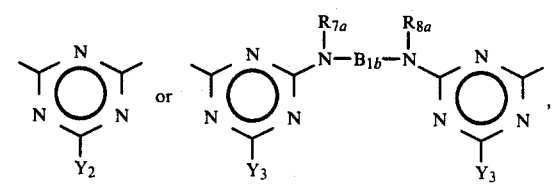

wherein $B_{1b}$ is 1,4-phenylene; 1,4-phenylene monosubstituted by chloro, methyl, methoxy, sulfo or carboxy;

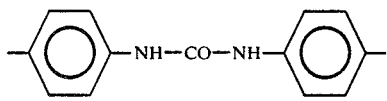

or

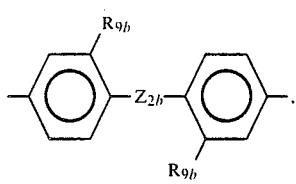

wherein each
$R_{9b}$ is independently hydrogen or sulfo, and
$Z_{2b}$ is a direct bond, —NH—, —CH=CH— or —CH$_2$CH$_2$—,
$R_{7a}$ is hydrogen or methyl,
$R_{8a}$ is hydrogen or methyl,
$Y_2$ is chloro, hydroxy, amino, 2-hydroxyethylamino, 2-sulfoethylamino, 2- or 3-hydroxypropylamino, di-(2-hydroxyethyl)amino, phenylamino, 3- or 4-sulfophenylamino or 3-carboxy-4-hydroxyphenylamino, and
each $Y_3$ is independently chloro, amino, 2-hydroxyethylamino, 2-sulfoethylamino, phenylamino or 3- or 4-sulfophenylamino,
each $D_2$ is

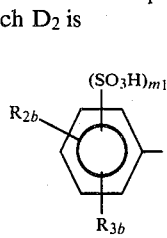

or 1,5-, 3,6-, 4,8-, 5,7- or 6,8-disulfonaphthyl-2, wherein
$R_{2b}$ is hydrogen, chloro, carboxy, methyl, methoxy, —COOR$_{4b}$ or acetamido, wherein $R_{4b}$ is methyl, ethyl or benzyl,
$R_{3b}$ is hydrogen, chloro, methyl or methoxy, and $m_1$ is 1 or 2,
each $M_2$ is

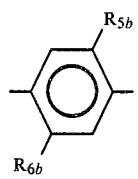

or 1,4-naphthylene, wherein
$R_{5b}$ is hydrogen, methyl, methoxy or sulfo, and
$R_{6b}$ is hydrogen, methyl, methoxy or acetamido,
each $R_{1a}$ is hydrogen or methyl, and
each

radical is in the 6-position of the naphthalene ring to which it is attached or each

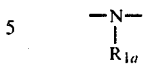

radical is in the 7-position of the naphthalene ring to which it is attached,
with the proviso that the two $D_2$'s are identical, the two $M_2$'s are identical, and the two $R_{1a}$'s are identical.

2. A compound according to claim 1, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

3. A compound according to claim 2, or a salt thereof each cation of which is independently lithium, sodium, potassium or ammonium.

4. A compound according to claim 3, or a salt thereof each cation of which is sodium.

5. A compound according to claim 1, or a salt thereof each cation of which is independently a non-chromophoric cation, wherein each $R_{1a}$ is hydrogen.

6. A compound according to claim 5, or a salt thereof each cation of which is independently a non-chromophoric cation, wherein
each $D_2$ is

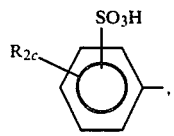

wherein
$R_{2c}$ is hydrogen, chloro, methyl, methoxy or acetamido.

7. A compound according to claim 6, or a salt thereof each cation of which is independently a non-chromophoric cation,
wherein
$R_{2c}$ is hydrogen, chloro or methyl.

8. A compound according to claim 5, or a salt thereof each cation of which is independently a non-chromophoric cation, wherein
each $M_2$ is

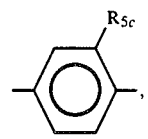

wherein
$R_{5c}$ is hydrogen or sulfo.

9. A compound according to claim 5, or a salt thereof each cation of which is independently a non-chromophoric cation, wherein
each —NH— radical is in the 6-position of the naphthalene ring to which it is attached.

10. A compound according to claim 5, or a salt thereof each cation of which is independently a non-chromophoric cation, wherein
$B_b$ is

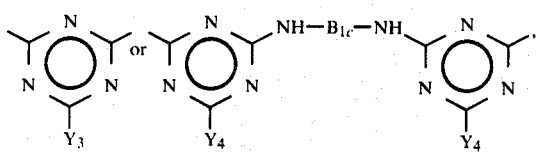

wherein
$B_{1c}$ is 1,4-phenylene or

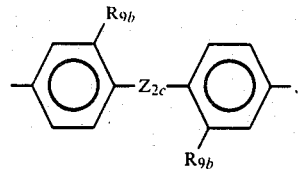

wherein
each $R_{9b}$ is independently hydrogen or sulfo, and
$Z_{2c}$ is —CH=CH— or —CH$_2$CH$_2$—,
$Y_3$ is chloro, amino, 2-hydroxyethylamino, 2-sulfoethylamino, phenylamino or 3- or 4-sulfophenylamino, and
each $Y_4$ is chloro, amino or 3-sulfophenylamino, with the proviso that the two $Y_4$'s are identical.

11. A compound according to claim 10, or a salt thereof each cation of which is independently a non-chromophoric cation, wherein
$B_b$ is

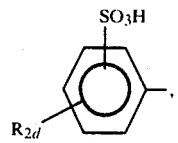

wherein
$R_{2d}$ is hydrogen, chloro or methyl, and
each $M_2$ is

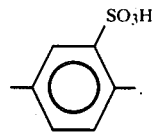

12. A compound according to claim 11, or a salt thereof each cation of which is independently a non-chromophoric cation, wherein $R_{2d}$ is hydrogen.

13. A compound according to claim 12, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

14. A compound according to claim 13, or a salt thereof each cation of which is independently lithium, sodium, potassium or ammonium.

15. A compound according to claim 14, or a salt thereof each cation of which is sodium.

16. The compound according to claim 12 having the formula

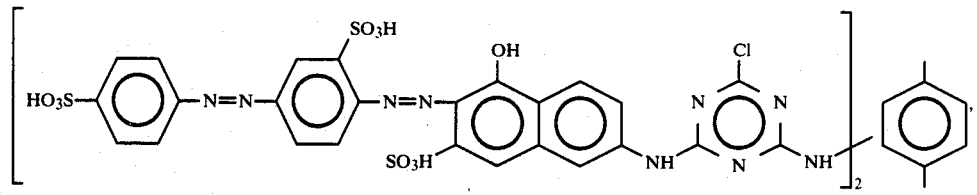

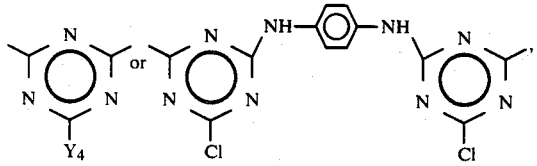

wherein
$Y_4$ is chloro, amino or 3-sulfophenylamino,
each $D_2$ is or a salt thereof each cation of which is independently a non-chromophoric cation.

17. The compound according to claim 12 having the formula

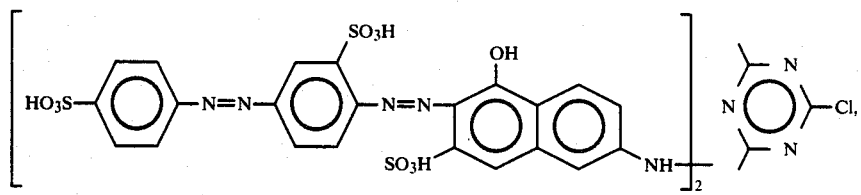

or a salt thereof each cation of which is independently a non-chromophoric cation.

18. A sodium salt according to claim 17.

19. The compound according to claim 12 having the formula

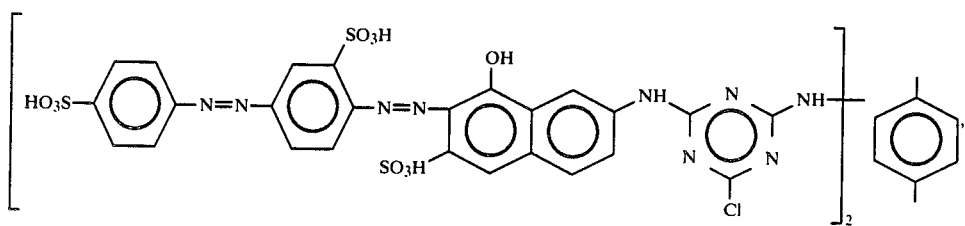
or a salt thereof each cation of which is independently a non-chromophoric cation.
* * * * *